(12) United States Patent
Gooden

(10) Patent No.: US 11,103,038 B2
(45) Date of Patent: Aug. 31, 2021

(54) PORTABLE AND COMPACT ACCESSORY HOLDER

(71) Applicant: Marcus Gooden, Seattle, WA (US)

(72) Inventor: Marcus Gooden, Seattle, WA (US)

( * ) Notice: Subject to any disclaimer, the term of this patent is extended or adjusted under 35 U.S.C. 154(b) by 0 days.

(21) Appl. No.: 14/496,854

(22) Filed: Sep. 25, 2014

(65) Prior Publication Data
US 2015/0136623 A1 May 21, 2015

Related U.S. Application Data

(60) Provisional application No. 61/882,258, filed on Sep. 25, 2013.

(51) Int. Cl.
| | |
|---|---|
| *A45C 11/20* | (2006.01) |
| *A45C 5/00* | (2006.01) |
| *A47K 10/20* | (2006.01) |
| *B60R 7/08* | (2006.01) |
| *A47K 5/18* | (2006.01) |
| *A47K 1/09* | (2006.01) |

(52) U.S. Cl.
CPC .............. *A45C 5/005* (2013.01); *A47K 10/20* (2013.01); *B60R 7/084* (2013.01); *A47K 1/09* (2013.01); *A47K 5/18* (2013.01)

(58) Field of Classification Search
CPC ........... B60N 2/24; A45C 11/20; A45C 5/005; A47K 1/09; A47K 10/20

USPC ..... 224/400, 276, 277, 484, 926; 220/915.2, 220/915.1
See application file for complete search history.

(56) References Cited

U.S. PATENT DOCUMENTS

| | | | |
|---|---|---|---|
| 4,516,676 A | 5/1985 | Cournoyer | |
| 6,254,160 B1* | 7/2001 | Marriott et al. | ............. 296/24.3 |
| 6,321,937 B1 | 11/2001 | DeSimone | |
| 6,588,821 B2* | 7/2003 | Worrell et al. | ............. 296/37.8 |
| 2001/0035416 A1* | 11/2001 | Dodson | ............... A47K 10/421 |
| | | | 220/524 |
| 2006/0011660 A1 | 1/2006 | Sandlin | |
| 2008/0011782 A1 | 1/2008 | Sidman | |
| 2011/0062178 A1 | 3/2011 | Godsell | |

* cited by examiner

*Primary Examiner* — King M Chu
(74) *Attorney, Agent, or Firm* — Boudwin Intellectual Property; Daniel Boudwin

(57) ABSTRACT

A toiletry and accessory holder is provided that is adapted to support a plurality of accessory items in a portable housing. The device supports a tissue paper dispenser, replacement tissue paper, lotion and sanitizer solution, hand towels, and straws from a single housing. The housing is well suited for use in a vehicle or in a hotel room, whereby several toiletry items are provided to the user upon need, in a single housing, and in a compact form. A tissue box is supported along one end of the housing, while a slot adjacent thereto provides access to an exposed tissue from the tissue box. Replacement tissues are stored opposite the tissue box, while a straw dispenser is disposed along the lower portion of the housing. Along the upper surface of the container are several recesses to support item such as sanitizer solution containers, hand towels, and drink containers.

3 Claims, 2 Drawing Sheets

PORTABLE AND COMPACT ACCESSORY HOLDER

CROSS REFERENCE TO RELATED APPLICATION

This application claims the benefit of U.S. Provisional Application No. 61/882,258 filed on Sep. 25, 2013. The above identified patent application is herein incorporated by reference in its entirety to provide continuity of disclosure.

BACKGROUND OF THE INVENTION

Field of the Invention

The present invention relates to portable, multipurpose storage units adapted to support sanitary wipes, tissues, lotions, and other accessories while away from home. Specifically, the present invention relates to a multi-chambered accessory storage unit and dispenser for toiletry items and other accessories for use in a vehicle or an alternative location in which separate accessories may not be readily available.

It is not uncommon for individuals to require tissues, wet wipes, sanitizing solution and other personal toiletry items while traveling in a vehicle or in a location away from home. While at home, these items are generally available as independent items and stored generally in a bathroom or water closet between uses. However, while driving or away from home, storing and making available these items is not as easy and requires the user to package the items together or loosely store them in a vehicle. The former is generally done while traveling for an extended period, and the latter leads to clutter and unorganized storage of such items. Neither alternative is preferable.

The traveling user would prefer organized storage and swift access to toiletry items while driving or otherwise away from home. In the car, quick access to tissues, lotions and sanitizing solution, beverage straws and other accessories is often desired. Placing these items in a glove compartment does not facilitate access or organized storage. Moreover, for one traveling and staying in a hotel room, ready access to such toiletry items is desired in the same manner as would be desired at home.

To address these concerns, the present invention is submitted as a new and novel toiletry and accessory holder for traveling users, which has applications for the driving user, for the traveling user in a temporary location, and for commercial enterprises in the business of hotel accommodation or car rentals. The holder comprises a housing adapted to support several different toiletry and accessory items therein and provide ready access to a user. Specifically, the housing supports a small tissue box, accommodates a hand sanitizer or soap dispenser container, sanitizing wipes, and other accessories within its interior. Specifically-designed apertures and access ports are provided to allow retrieval of each item from the exterior of the housing. It is contemplated the accessory holder of the present invention can be deployed within the interior of a vehicle while traveling, within the interior of a hotel room, or any similar environment in which access to toiletries and personal accessories are desired and limited access is otherwise provided.

Description of the Prior Art

Devices have been disclosed in the prior art that relate to napkin holders, fluid dispensers and toiletry items. However, these devices generally relate to specifically design dispensers or assemblies not suited for supported different lotions, napkins, and other toiletry items in a portable fashion and with a single housing. The following is a list of devices deemed most relevant to the present disclosure, which are herein described for the purposes of highlighting and differentiating the unique aspects of the present invention, and further highlighting the drawbacks existing in the prior art.

One such device in the art is U.S. Patent Publication No. 2001/0035416 to Dodson, which discloses a wipe container that comprises a carrying case for both wet wipes and dry wipes. The case includes a dual compartment design and lids for each compartment, whereby a user can extract either wet or dry wipes as desired. This type of device is one that supports the function of providing both wet and dry wipes to the user. The present invention contemplates a multifunction device that supports tissue material, sanitizing solution, hand towels, straws, and other accessories that one may deem necessary while traveling or driving.

Another device is U.S. Patent Publication No. 20011/0062178 to Godsell, which discloses a dispenser for hand wipes and hand gel that is adapted to be supported by a vehicle cup holder. The Godsell device provides access to wipes and lotion while in a vehicle and is supported by the in-vehicle cup holder. The present invention contemplates a multi-purpose dispenser that is useful in a vehicle, however the structure and carrying capacity of the present invention diverges from that of Godsell.

U.S. Patent Publication No. 2006/0011660 to Sandlin discloses a portable dispensing apparatus that supports a variety of fluid and solid materials in a main body having several chambers. The Sandlin device is a capped dispenser for fluid that can be refilled and used in a portable fashion. The present invention, by contract, provides a device that supports dispensers and various hand towel, hand wipe, or napkin toiletry items in a portable configuration.

In light of the prior art and the features of the present invention, it is submitted that the present invention provides a novel toiletry and accessory holder that is particularly well adapted for portable and travel use. The features of the present invention substantially diverge in elements from the prior art, and consequently it is clear that present invention substantially fulfills a need for portable toiletry items and proper storage thereof.

SUMMARY OF THE INVENTION

In view of the foregoing disadvantages inherent in the known types of portable toiletry and accessory holders now present in the prior art, the present invention provides a new assembly that can be utilized for providing convenience for the user while traveling and provide access to tissues, towels, sanitizing solution and other toiletry items.

It is therefore an object of the present invention to provide a new and improved toiletry and accessory holder that has all of the advantages of the prior art and none of the disadvantages.

It is another object of the present invention to provide a toiletry and accessory holder that supports tissues, lotions, and other items in a multi-chambered housing.

Another object of the present invention is to provide a toiletry and accessory holder that comprises a portable assembly that can be used in a vehicle or in a hotel room.

Yet another object of the present invention is to provide a toiletry and accessory holder that includes a tissue paper dispenser and a location to store replacement tissue paper.

Another object of the present invention is to provide a toiletry and accessory holder that also dispenses straws using a single-straw dispenser.

Another object of the present invention is to provide a toiletry and accessory holder that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
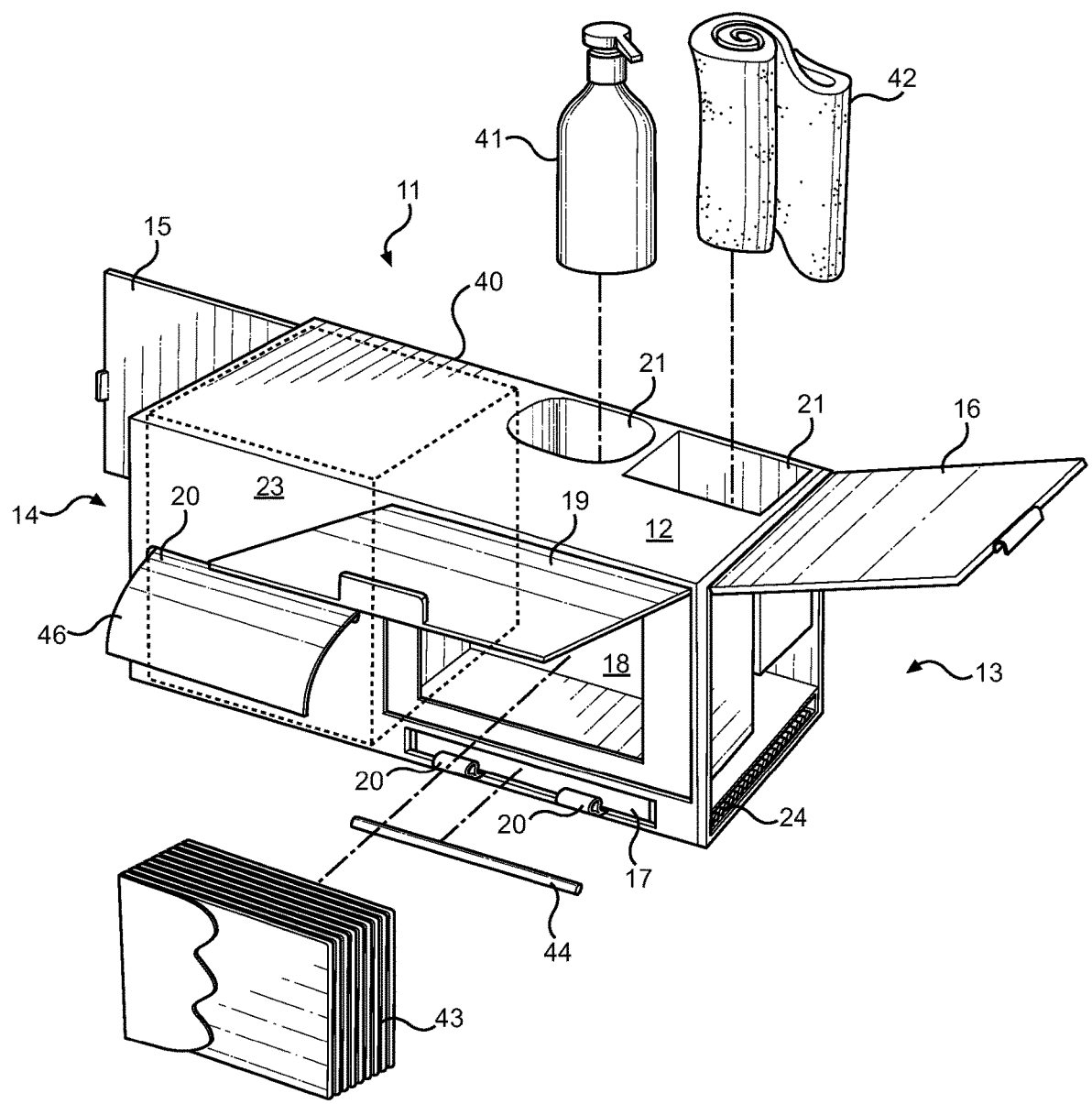
FIG. 1 shows a view of the toiletry and accessory holder of the present invention in an open position.

Reference is made herein to the attached drawings. Like reference numerals are used throughout the drawings to depict like or similar elements of the toiletry and accessory holder of the present invention. For the purposes of presenting a brief and clear description of the present invention, the preferred embodiment will be discussed as used for supporting accessory and toiletry items in a portable container. The figures are intended for representative purposes only and should not be considered to be limiting in any respect.

Referring now to FIG. 1, there is shown a perspective view of the toiletry and accessory holder of the present invention. The assembly comprises a housing 11 having a plurality of internal compartments and upper surface recesses to support various items that may be desired while traveling, particularly when in a vehicle or while staying overnight in a hotel room. The housing 11 comprises a first end 14 and a second 13. Both ends are open and comprise a hinged door 15, 16 thereover, which secures the respective open end and operably provides access into the housing interior.

The housing 11 comprises a forward surface 23, an upper surface 12, a first 14 and second 13 end, a rear surface and a base surface. Between the surfaces is an open interior within which several accessory items and supports are provided. The housing preferably comprises a rectangular cuboid shape, however alternate shapes are contemplated in which the outer surfaces of the housing are form more complex or more numerous surfaces than that shown in FIGS. 1 through 3. Alternate shapes include those with curved surfaces and differing design features, falling within the scope of the claimed invention and providing toiletry and accessory item support.

Disposed along the first end 14 of the housing is an opening to the interior volume of the housing, which is operably covered by a first end door 15. The door 15 is hingedly attached to the end of the housing and includes a latch or clip for securing closed against the housing when pressed thereagainst. When open, the first end 14 provides access to the housing interior along the first end 14 such that a tissue box 40 may be placed therein. The open interior of the first end 14 is adapted to accommodate substantially square tissue boxes therein and support an exposed tissue paper article 46 from the forward surface 23 of the housing when deployed. Along the forward surface 23 and adjacent to the first end 14 is an elongated slot 20 that is adapted to receive therethrough an exposed length of tissue paper 46 from the tissue box 40 within the housing. The user can therefore have ready access to tissues and withdraw a tissue from the box one at a time from the slot until the tissue box 40 has been exhausted.

Adjacent to the slot 20 and along the forward surface 23 of the housing is a forward access door 19 and a forward storage compartment 18. The forward storage compartment 18 is an open compartment accessible through the forward surface 23 of the housing and covered by the forward access door 19. The compartment 18 is adapted to support replacement tissue paper 43 for the tissue box 40 disposed within the first end 14 of the housing 11. This allows a user to refill the tissue box 40 when exhausted, rather than replace the box 40 entirely. Alternatively, the compartment 18 may support napkins or another type of paper product having a different function than the tissue paper 46. Further still, the compartment 18 may serve as a general storage compartment for alternative accessory or toiletry items, which can be securely enclosed therein by closing the forward access door 19. The forward access door 19 is hingedly connected to the forward surface 23 of the housing and operably securable over and deployable from the compartment 18.

Disposed below the forward storage compartment 18 is a straw dispenser assembly 17. The straw dispenser assembly 17 comprises a cartridge or plurality of straws supported within a tray behind an elongated straw slot disposed below the compartment 18. Straws are stored within a tray 29 under the compartment 18 and within the interior of the housing, and individually dispensed to the user upon input therefrom. Several embodiments of the dispensing mechanism are contemplated. It is recognized that one skilled in the art of straw dispensers would readily recognize and appreciate that alternative dispensing devices may be deployed from the straw slot. As shown in FIG. 1, individual straws 44 are displayed using a hinged lever mechanism, which in which the user depresses a spring-biased catch downwards using exposed tabs 20 to dispense a single straw 44 from the tray 29 and onto one or more of the tabs 20.

Along the upper surface 12 of the housing is a plurality of recesses 21 within which personal items, containers and drink cups can be supported. The recesses 21 are openings within the upper surface 12 that are enclosed, thereby providing a convenient location within which to support elongated items in an upright condition. These items include drink cups, hand sanitizer or lotion containers 41, hand towels 42, and other items. The recesses 21 extend downward into the interior of the housing and are preferably disposed rearward of the forward compartment 18. The recesses comprise substantially enclosed depressions having an open upper and configured to support an accessory article in a substantially upright condition from the upper surface of the housing.

Along the second end 13 of the housing is located a second opening into the interior of the device. A second hingedly attached door 16 is hinged to the open end of the housing at this end and operably secures over the second end 13 when pressed thereagainst. As with the first end door 16, the second end door 16 includes a latch or securing device to maintain the door 16 in a closed condition when pressed against the second end 13 of the housing. This end of the housing provides access to the straw tray 29 to replace the straws.

Figure 2:
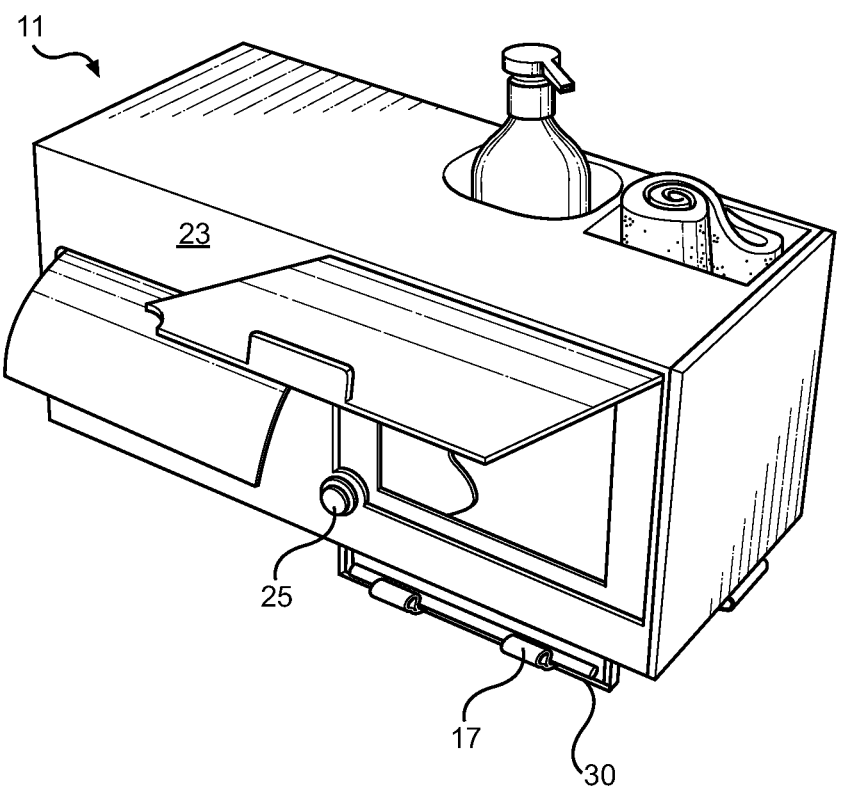
FIG. 2 shows a view of the toiletry and accessory holder of the present invention and the button-activated straw dispenser.

Referring now to FIG. 2, there is shown an alternate embodiment of the straw dispensing mechanism of the present invention. In this embodiment, the mechanism releases a single straw from the internal tray using a button 25 disposed along the forward surface 23 of the housing 11. The straw is disposed onto a catch 17 supported along a lower lip 30 of the housing. The lower lip 30 may be disposed along the forward, lower corner of the housing, or along the forward surface 23 thereof. Furthermore, the lower lip 20 may extend along the entire length of the forward surface 23 or only partially therealong.

Figure 3:
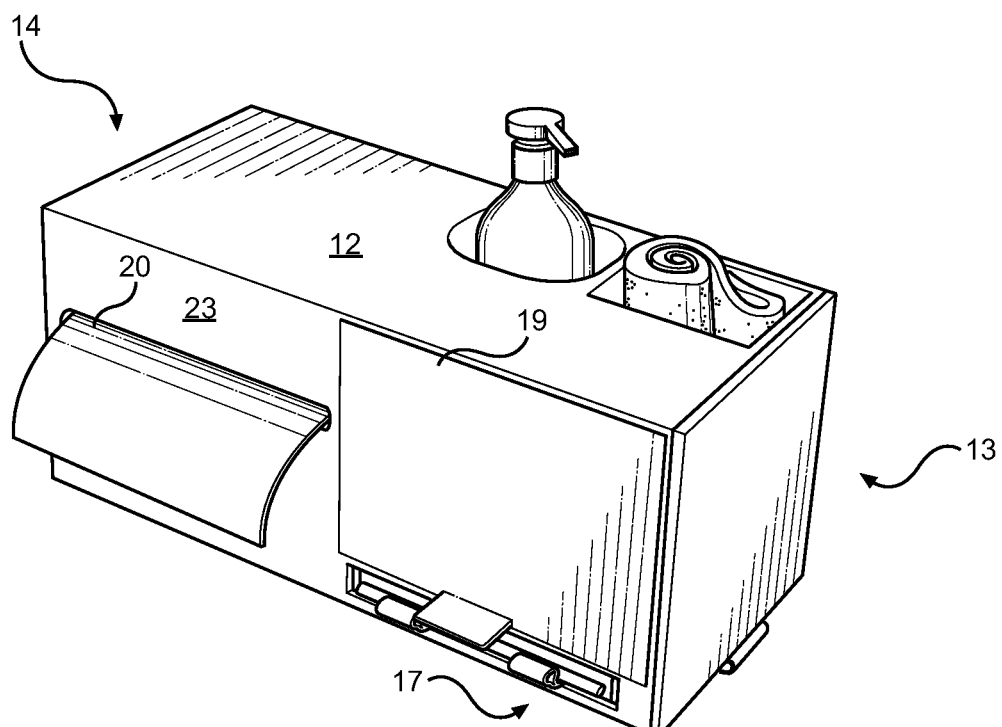
FIG. 3 shows a view of the toiletry and accessory holder of the present invention and the latch-activated straw dispenser.

Referring finally to FIG. 3, there is shown a final perspective view of the toiletry and accessory holder of the present invention, wherein the access doors of the device are in a closed state and the housing is supporting several items. This view shows the forward access door 19 in a closed position over the forward storage compartment, along with the first and second access doors in a closed state over the first 14 and second 13 ends, respectively. Furthermore, a length of tissue paper is exposed from the elongated slot 20 along the forward surface 23 of the housing, while accessory items are stored within the recesses of the upper surface 12.

Overall, the present invention provides a convenient way to maintain tissues, wet wipes, towels, and other items organized in a portable assembly. The device includes a holder for keeping tissue paper and other sanitary items in an organized manner and in a compact form, thereby enabling easy storage in a glove compartment, vehicle door, or other desired location. This ensures a traveler has easy access to a variety of commonly used supplies and toiletry items while driving and traveling, reducing the need to loosely store these items in a vehicle or hotel room for a user to find and retrieve.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable and compact accessory holder, comprising
a housing having a forward surface, a first end, a second end, an upper surface, a rear surface, a base surface, and an interior volume;
said first end comprising an opening for accessing said interior volume and having a first door operably securable thereover;
wherein said interior volume of said housing is configured to support a tissue box;
an elongated slot disposed along said forward surface and adjacent to said first end, said elongated slot being configured to receive an exposed article of tissue paper from said tissue box;
one or more recesses disposed within said upper surface, said recesses comprising substantially enclosed depressions having an open upper end configured to support an article in a substantially upright condition;
a straw dispenser assembly disposed along said forward surface and adjacent to said base surface;
said straw dispenser comprising an elongated straw dispenser slot and a straw dispensing mechanism that dispenses one straw at a time from a plurality of straws stored within said interior volume of said housing.

2. The portable and compact accessory holder of claim 1, further comprising:
a forward storage compartment disposed within said forward surface and adjacent to said elongated slot;
a forward access door hingedly attached to said forward surface and securable over said forward storage compartment.

3. The portable and compact accessory holder of claim 1, wherein:
said second end further comprises an opening for accessing said interior volume of said housing and having a second door operably securable thereover.

* * * * *